Aug. 5, 1969   E. E. MUELLER   3,459,602
HIGH TEMPERATURE TEMPORARY PROTECTIVE CERAMIC COATING
COMPOSITIONS FOR METALS, AND RESULTING COATED METAL
ARTICLES
Filed April 3, 1964

EDWARD E. MUELLER
INVENTOR

BY G. G. Christensen
ATT'Y

United States Patent Office 3,459,602
Patented Aug. 5, 1969

3,459,602
HIGH TEMPERATURE TEMPORARY PROTECTIVE CERAMIC COATING COMPOSITIONS FOR METALS, AND RESULTING COATED METAL ARTICLES
Edward E. Mueller, Baltimore, Md., assignor, by mesne assignments, to SCM Corporation, New York, N.Y., a corporation of New York,
Filed Apr. 3, 1964, Ser. No. 357,255
Int. Cl. C23b 7/08; C23c 1/12
U.S. Cl. 148—22          13 Claims

ABSTRACT OF THE DISCLOSURE

Easily removable protective coating compositions for metals which are to be heated to a temperature of between 2200° and 2400° F. have been formulated and are described. The coating compositions comprise an intimate mixture of finely divided inorganic components suspended in a liquid carrier containing a solidifiable organic resin binder. The inorganic components consist essentially of:
(A) From about 80 to about 95 weight percent of a comminuted mixture composed of from about 50 to about 80 weight percent of alumina, having a purity of at least 95% and from about 50 to about 20 weight percent of titania, having a purity of at least 95%, and
(B) From about 20 to about 5 weight percent of a comminuted vitreous-phase-forming material.
The compositions falling within the scope described are suspended in a liquid medium and are applied to metals which are to be heated at temperatures within the above-described ranges for purposes of forging, rolling, annealing, etc., to form easily removable temporary coatings which protect surfaces of the metal against oxidation, decarburization, and the like.

---

Figure 1:
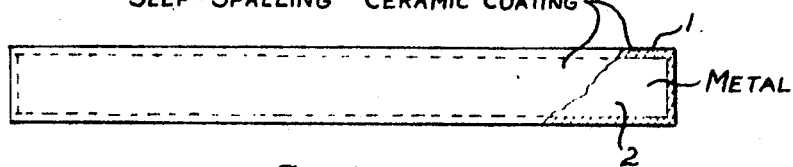

This invention relates to temporary ceramic coating compositions for metals which serve to protect the substrate metal from oxidation while heated at high temperatures for forging, rolling, heat-treating, etc. The coating compositions are inexpensive to use, can be self-removing when the substrate metal is cooled, and assure good protection to the substrate metal for moderately prolonged periods of time while being hot-worked or otherwise exposed to oxidizing conditions at temperatures up to about 2400° F.

In the processing of most steels and of many other types of metals it is necessary at some stage to heat ingots, bars, billets, and other configurations in order to facilitate their fabrication into different shapes or to develop certain metallurgical properties. The temperatures involved are oftentimes high enough to cause deleterious reactions to occur unless preventative steps are taken. These detrimental reactions assume many forms but, most notably in iron alloys, they may involve oxidation or decarburization. In the case of oxidation particularly, considerable losses of metal are common in the form of the oxide coating which is developed. One method of alleviating this difficulty is through the use of a controlled atmosphere furnace. In instances where large sizes are encountered, however, the cost of such an operation can be prohibitive.

Another means for accomplishing the same end considerably more economically is through the use of temporary protective coatings. In general these protective coatings serve as a barrier between the metal substrate and the furnace or ambient atmosphere and prevent the diffusion of gasified materials from the metal into the atmosphere or, conversely, the passage of gaseous contaminants to the metal substrate.

Coatings of various types have been used extensively for metal protection on a more or less permanent basis. Such coatings have contained both organic and inorganic components and may also have comprised predominantly metallic constituents. Conventional porcelain enamels are also in widespread use for permanent protection purposes.

Ceramic coatings of a temporary nature which have been developed in past years, although satisfactory from the point of view of protection, have had some limitations which have been overcome in the materials to be described hereafter. For the most part, entirely different inorganic components are used here in order (1) to extend the use range to considerably higher temperatures and (2) to be utilizable in conjunction with the considerably more complex metal alloys which have been developed during recent years. In addition, organic components can be utilized as carries for the inorganic materials. Through their use it has been possible to develop considerable handling resistance which is necessary in order to avoid coating damage from mechanical handling operations usually encountered in metal-working plants.

In order that such ceramic coatings may be made adaptable to a variety of metal-processing operations, they must have certain physical and chemical properties. Among these are the following:

(1) The consistency of the coating must be such as to permit application by spraying, brushing, or dipping.

(2) The coating must have a satisfactory "shelf life," i.e., must be a stable suspension or dispersion, in order to prevent excessive settling.

(3) The coating must dry rapidly under ambient conditions or under force-dry conditions at moderately elevated temperatures.

(4) The coating must be resistant to severe handling operations.

(5) The coating should not evolve material(s) which would be harmful to heat-treating furnaces, other equipment, or personnel.

(6) The coating should be continuous at relatively low temperatures and maintain this continuity through the entire temperature range to which the metal is exposed.

(7) The viscosity of the coating at the desired elevated temperatures should be such as to prevent the diffusion of gaseous materials.

(8) The coating should be free from ingredients which would cause metal contamination or deterioration.

(9) The coating must be readily removable after the metal's heat treatment or exposure, either by chemical or mechanical means or by spontaneous thermal spalling.

(10) The coating must be compounded from materials such that its total cost would be commensurate with or less than the savings gained from its use, either from prevention of metal loss or retention of original surface condition.

The coatings described hereinafter are all characterized by a majority of the properties itemized above.

In general the temporary protective ceramic coatings field can be divided into three broad areas on the basis of temperature and, to some extent, on the reactions likely to be encountered in these temperature ranges. In most common steels and, more particularly, in some of the more recently developed tool steels, decarburization is likely to occur at relatively low temperatures of 1300° F. to 1850° F. Oxidation will also occur in this temperature range although in developing the optimum metallurgical requirements in the substrate metal decarburization is often considered to be the more critical reaction. In general I use a vitreous-type coating to prevent such reactions. Owing to the mass of the metal often encountered and the low temperatures involved, the coatings used in this range are most readily removed by chemical treatment or by mechanical means.

An intermediate temperature range from 1800° to 2200° F. may be encountered with stainless steels and other high alloys where annealing or heat-treating operations are used in order to develop the desired metallurgical characteristics. Owing to the low carbon content of such metals and their inherently greater resistance to oxidation, I use coatings of considerably different compositions from those in the first temperature range, although they are still basically of a vitreous nature. They may, however, contain certain crystalline components in order to develop the appropriate thermal spalling characteristics.

The third temperature range encountered may be described as a hot-working range and may involve temperatures as high as 2400° F Since size reduction and shape change may follow heat treatments of this nature, the characteristics of the coating may require considerable alteration. Where oxidation protection alone is desired for one reason or another, a vitreous-type coating may be satisfactory. On the other hand, where operations such as forging and hot rolling are to follow, the lubricity characteristics of the coating material are paramount and may require the utilization of a coating which is entirely crystalline in nature or one with only a minor amount of a vitreous component.

For all three temperature ranges I have developed different coating compositions providing either adequate oxidation protection or decarburization resistance or both. See copending applications Ser. Nos. 357,135, 357,136, and 357,137, all filed simultaneously with the present application and assigned to the same assignee. In addition, the inorganic materials which have been utilized can be suspended and dispersed in an aqueous binder carrier or in an organic volatile solvent solution of one or more solidifiable resins, thereby to secure a coating which, after being applied and dried, has sufficient strength to permit handling and some abuse. This insures that the coating will remain in place until the coated metal part has been transported to and inserted in the heat-treating or annealing furnace. The optimum organic components are such that they are readily eliminated within the furnace without destroying the continuity of the coating or leaving residual matter which may interfere with the efficacy of the inorganic components of the coating system. I have found that solidifiable resins which leave a residue (carbon plus ash) less than about 3.50% by weight are suitable for my purpose. The residue of a selected resin can be determined by the Conradson or equivalent tests. The Conradson test is described in ASTM Standards, 1946, part III–A, p. 120.

Thus, the high temperature coating systems which are hereinafter described deal not only with the new inorganic components but also with the liquid aqueous binder carrier(s) and the liquid, organic solidifiable resin binder carrier solutions.

The inorganic components of the present invention comprise 50–80% of alumina and 20–50% of titania having a purity of at least 95% as the main constituents, with or without small added amounts (up to 20%) of frits, sodium silicate and/or other glassy components to supply a vitreous phase.

Accordingly, it is an object of this invention to provide novel high temperature ceramic coating compositions utilizing 50–80% of alumina and 20–50% of titania as the main comminuted inorganic constituents, without added glassy components.

It is a further object to provide similar coating compositions which include said small added amounts of comminuted glassy components.

Another object is to provide coatings of the kinds described utilizing either aqueous or organic vehicles as dispersing carriers for the comminuted inorganic components.

Another object is to provide novel coated metal articles in which the coating consists of a dried protective layer of the foregoing coating compositions.

These and other objects will be understood from the foregoing and following description of the invention taken in conjunction with the attached figure of drawings which is a side view of a coated metal article of the invention, having a portion of the coating 1 broken away to show the substrate metal 2.

The coatings described herein are envisaged primarily for use on stainless steels or other simple or complex alloys containing low or nil carbon content. This need not preclude their use on medium or high carbon content steels or alloys, should the need arise.

In many heat-treating or annealing operations involving stainless steels, it is desirable that metal loss due to oxidation be prevented or that the original surface condition be maintained insofar as possible. This implies, therefore, particularly in regard to the latter requirement, that the coating be readily removable after the thermal processing operation. By proper design of the inorganic portion of the coating compositions, it is possible to develop, through a severe mismatch of the thermal expansion coefficients of the coating and susbtrate metals, a sufficiently severe stress condition to cause spontaneous spalling from the metal surface. This stress may be either tensile or compressive in character. The latter is generally to be preferred since in some instances the inorganic materials required to develop a high coefficient of expansion are not sufficiently refractory to provide satisfactory resistance to oxidation in higher temperature ranges.

It is important that the spalling does not occur too early in the cooling cycle. If it does, some oxidation of the substrate can occur after the protective coating has spalled. It has been found possible to adjust the coating composition using additions of oxides of the metals present in the metal substrate. Thus for a nickel-chromium stainless steel, oxides of iron, chromium, and nickel can be used. Nickel oxide has been shown to be the most effective retardant to spalling, causing to form, apparently, a weak bond between the coating and basis metal which is ultimately overcome by the thermal stresses developed during cooling. By controlled additions of this material spalling can be delayed to a temperature level below that at which oxidation will occur.

The furnace atmosphere can also have some effect on the behavior of the protective coatings and their ultimate spalling characteristics. A reducing atmosphere has been found to enhance the bonding effect of the nickel oxide and prevent complete spontaneous spalling. Additions of oxidizing agents such as arsenic trioxide have been found to alleviate this condition and are used in small amounts in this capacity as needed. This apparently offsets the tendency for the added metal oxide (such as the nickel oxide mentioned above) to be partially reduced and bond the coating more firmly to the metal substrate.

As mentioned previously, it is desirable that the thermal expansion coefficient of the coating be lower than that of the metal substrate. This is achieved in part by adjusting the composition of the added vitreous portion of the coating. This portion may consist of one or more fusible materials indicated by compositions described below. Such vitreous-phase-forming materials are selected also to have adequate refractory and viscosity characteristics so that they will withstand the high temperatures involved and, at the same time, remain in position owing to their resistance to flow.

The vitreous compositions preferred for use in this invention are primarily alkaline earth alumino-silicates alkali metal silicates. and/or feldspar. They may contain other ingredients such as boric oxide in order to modify the physical properties of the resultant coating system. The basic composition utilized for many of the vitreous components is the eutectic for the ternary system enstatite (MgO.SiO$_2$), silica (SiO$_2$), and cordierite $$(2MgO.2Al_2O_3.5SiO_2)$$

whose chemical composition is:

| | Percent (wt.) |
|---|---|
| MgO | 20.3 |
| Al$_2$O$_3$ | 18.3 |
| SiO$_2$ | 61.4 |

Figure 2:
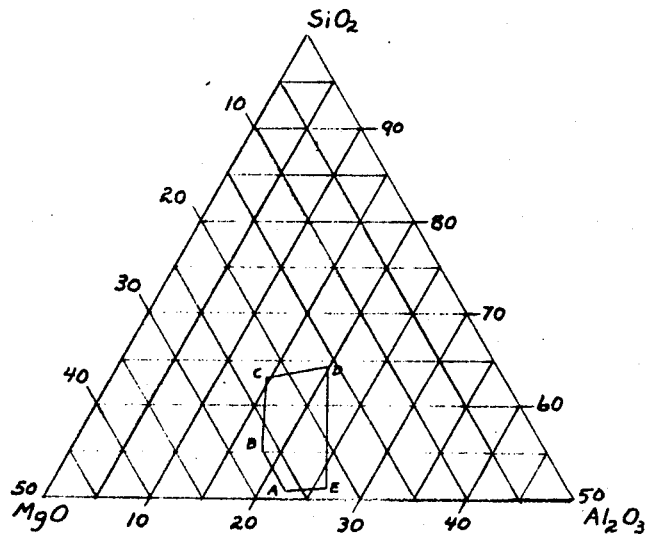

Substitutions of other alkaline earth oxides in amounts up to about 6% can be made for part of the MgO; additions of boric acid in amounts up to 30% can also be made while holding the aforementioned materials in essentially the same proportions indicated above, or while holding proportions falling in the designated area of FIGURE 2, next described.

From practical limitations resulting from conventional smelting equipment, it is preferable that the primary vitreous system shown above be held within the boundaries of the 1400° C. isothermal line of the MgO-Al$_2$O$_3$-SiO$_2$ system (reported by G. A. Rankin and H. E. Merwin, American Journal of Science, 4th Series, 45, 322, 1918) and shown on the diagram revised and redrawn by E. F. Osborne and Arnulf Muan (College of Mineral Industries, Pennsylvania State University, copyrighted 1960 by The American Ceramic Society). FIGURE 2 of the drawings identifies this area (ABCDEA). The parameters of the five corners of this area, in weight percent, are:

| MgO | SiO$_2$ | Al$_2$O$_3$ |
|---|---|---|
| 16 | 64.3 | 19.7 |
| 22.2 | 63.2 | 14.6 |
| 26.6 | 55.4 | 18.0 |
| 26.6 | 50.6 | 22.8 |
| 23.0 | 51.0 | 26.0 |

The following compositions are presented to illustrate formulations which have been utilized successfully:

| | Frit A, percent | Frit B, percent |
|---|---|---|
| CaO | 2.6 | 4.3 |
| MgO | 13.9 | 14.9 |
| Al$_2$O$_3$ | 13.1 | 20.3 |
| SiO$_2$ | 50.2 | 60.5 |
| B$_2$O$_3$ | 20.2 | |
| | 100.0 | 100.0 |

It should also be pointed out that in some instances it is possible to use various other materials instead of the pre-reacted (fritted) vitreous systems mentioned above. Thus, for example, materials such as silica, clay, boric acid, talc, and the like can be blended in a proportion such that they will yield the same ultimate chemical analysis as shown for the compositions described above.

For control of spalling temperature, the frits can be further modified by adding up to 16% of nickel oxide, iron oxide and/or chromic oxide with or without up to 0.4% of arsenic trioxide, said percentages being based on the weight of the frit in the formulation.

Turning now to the crystalline components of my present high temperature coating formulations, it will be understood that coating materials for use in regions of high temperature (ca. 220°–2400° F.) must have refractory characteristics sufficient to withstand long time thermal processing operations. Best results have been obtained with my described compositions containing both vitreous and crystalline components, although in some instances my completely crystalline systems have also been found to be highly efficacious since I have discovered that it is possible to develop a dense, impermeable coating through a solid state sintering reaction of the comminuted crystalline alumina and titania. When such a crystalline coating system is used on a metal such as a stainless steel which is fairly resistant to oxidation up to a temperature range where the coating becomes impermeable, subsequent protection at higher temperatures is satisfactory. When the same coating is used on other materials such as tool steels, however, oxidation may occur prior to the development of the impervious layer. In such case, the addition of less refractory vitreous materials (described above) such as sodium silicate, frits A and/or B and/or feldspar can be made in order to enhance the formation of the impermeable condition at a somewhat lower temperature.

Heating rates also affect the behavior of the coating to some extent. If the temperature increase can be made sufficiently rapid, the coating will develop its impermeable structure with negligible oxidation of the underlying metal.

The following examples illustrate the principles of the invention and include the best modes presently known to me for practicing the invention in accordance with those principles. In all examples, the alumina and titania have a purity of at least 95%.

EXAMPLE I

The following materials are charged to a porcelain ball mill and therein ground together until all particles are finer than 100 mesh, and until at least 50% by wt. are finer than 325 mesh:

| | Parts (wt.) |
|---|---|
| Aluminum oxide | 75 |
| Titanium dioxide | 25 |
| Water | 30 |

The resulting coating composition is thinned with water to a sprayable consistency, and then is sprayed on a stainless steel rod to a dry film thickness of about 12 mils. The coated rod is then dried at ambient temperatures or in a force-drying oven and then is placed in a gas/air furnace having an oxidizing flame wherein it is heated to about 2350° F. and held at this temperature for 2 hours. The hot rod is then removed from the furnace and allowed to cool in air. The coating spalls off during cooling to expose the metal surface. Excellent protection against oxidation is evident.

EXAMPLE II

When the wet-ground composition of Example I is dried to remove water and the resulting powder is dispersed in any of a variety of organic solvent/resin solutions, considerably better suspension characteristics are developed and the resulting coatings give dry films which also afford excellent protection to the underlying metal. The following formulations represent typical organic carriers in which the dry powders can be dispersed for application purposes at various levels of non-volatile-matter between about 30% and 80% by weight.

Formulation A

| | Percent (wt.) |
|---|---|
| Acryloid F–10 [1] | 57.7 |
| Mineral spirits | 41.3 |
| Aluminum stearate | 1.0 |

[1] Acryloid F–10 is a solvent solution of poly(butyl methacrylate) resin; 40% solids by wt.; Gardner-Holdt viscosity, at 40% solids, of G. The resin per se has a specific gravity of 0.91.

A coating composition prepared with equal weights of Formulation A and of the dry powdery oxides of Example I gives a dry film which has good strength and adhesion, and which is difficult to dislodge by rough handling from a coated bar, rod or plate.

Formulation A gives a residue (carbon plus ash) below 1% when tested by the Conradson or equivalent tests. It will be understood that most of the residue is aluminum oxide derived from the aluminum stearate.

Formulation B

| | Percent (wt.) |
|---|---|
| Vinyl-toluenated alkyd resin | 28.2 |
| Xylene or naphtha (or mixtures) | 71.8 |

Formulation B is heat-setting but gives an air-dried oxide/resin coating which resists considerable rough handling before a coated metal part is placed in a furnace for heat-treatment. The formulation leaves a residue (carbon plus ash) of about 3.50% by weight when subjected to the Conradson or an equivalent test. I have found that this relatively high amount of residue causes no difficulties at any stage in the heat-treatment of a coated metal article and does not interfere in any way with securing good protection of the metal by the inorganic materials of a coating. A typical coating can be prepared from about 23% (wt.) of Formulation B and 77% of the dry oxide powders of Example I.

EXAMPLE III

The following materials are dry-ground in a porcelain ball mill until the particles are finer than 100 mesh and until at least 50% of them are finer than 350 mesh.

| | Parts (wt.) |
|---|---|
| Aluminum oxide | 71 |
| Titanium dioxide | 24 |
| Frit A supra | 5 |

Half of the resulting powder is dispersed in an equal weight of Formulation A, and the other half is dispersed in an equal weight of Formulation B. The resulting coating compositions are applied separately to different stainless steel bars and air-dried, then the coated bars are heat-treated in accordance with the schedule of Example I. Both coatings spall off of the metal during cooling, and both provide excellent protection against oxidation of the underlying metal.

EXAMPLE IV

Example III is repeated except for the replacement of Frit A with an equal weight of sodium silicate. In one set of tests anhydrous sodium silicate (a dry powder) is used, and in another set of tests dry hydrous sodium silicate powder is used. Both silicates have an $Na_2O:SiO_2$ ratio of 1:2, but silicates having any ratio between 1:1 and 3:10 (wt.) can be used equally well.

The so-modified coatings provide good resistance to oxidation of stainless steel, low-carbon steel and tool steel at temperatures up to about 2400° F.

EXAMPLE V

Example III is again repeated except for replacement of Frit A with five parts (wt.) of the following comminuted mixture:

| | Percent (wt.) |
|---|---|
| Silica | 4 |
| China clay | 27 |
| Boric acid | 27 |
| Talc | 30 |
| Nickel oxide | 12 |

The foregoing materials are dry-ground together in a porcelain ball mill until all particles are finer than 100 mesh.

It will be understood that when this comminuted mixture is added to the aluminum oxide and the titanium dioxide of Example III, it supplies a vitreous-phase-forming component in the coating. As the following figures show, the mixture, when recomputed to its ultimate analysis, has a composition falling within the pentagonal area ABCDEA of FIGURE 2. The ultimate analysis of this mixture is:

| | Percent |
|---|---|
| $SiO_2$ | 42.9 |
| $Al_2O_3$ | 12.8 |
| MgO | 11.5 |
| $B_2O_3$ | 18.3 |
| NiO | 14.5 |

When these figures are again recomputed so as to have $SiO_2+Al_2O_3+MgO$ equal to 100%, the percentages are:

A

| | Percent |
|---|---|
| $SiO_2$ | 63.9 |
| $Al_2O_3$ | 19.1 |
| MgO | 17.0 |
| Total | 100.00 |

Based on A

| | |
|---|---|
| $B_2O_3$ | 27.2 |
| NiO | 21.6 |

When the heat-treating tests of Example III are carried out with the herein-described modification of the inorganic phase, using either of the organic carriers of Example III, the coating spalls off the metal in each instance, and reveals metal surfaces evidencing excellent protection against oxidation at the high temperatures of the tests.

EXAMPLE VI

When 5% (wt.) of the comminuted mixture identified in Example V is added to the coating composition of Example I, improved suspension characteristics are secured, and a stainless steel or tool steel sample coated with the modified coating composition, when tested in the manner described in Example I, receives good protection against oxidation. The coating spalls off the metal samples when the latter are cooled from the furnace temperature.

EXAMPLE VII

Example I is repeated except for adding 5% (wt.) of sodium silicate to the formulation of Example I. The sodium silicate can be in any of the four known forms; i.e., anhydrous sodium silicate, powder, hydrous sodium silicate powder, aqueous anhydrous sodium silicate or aqueous hydrous sodium silicate. As indicated in Example IV the $Na_2O:SiO_2$ ratio can be between 1:1 and 3:10, by weight. The coating composition of Example I, as modified with any of such forms of sodium silicates or with any of such $Na_2O:SiO_2$ ratios, provides excellent protection to the underlying metal and spalls off during cooling.

EXAMPLE VIII

When the water of the formulations of Examples I and VII is replaced with an equal weight of the following aqueous emulsion of resinous binders, coating compositions are secured which develop dry, applied coatings having good resistance to accidental dislodgment during handling. The coatings afford good protection against oxidation of the underlying metal.

The aqueous emulsion is a blend of the following commercially-available emulsions:

| | |
|---|---|
| Rhoplex AC-33 [1] | 55.6 |
| Vinsol emulsion [2] | 44.4 |

[1] Rhoplex AC-33 is a nonionic alkaline aqueous emulsion of an acrylic ester polymer; pH 9-9.5; 46-47% solids. The acrylic ester polymer has a $T_f$ of 28° C; that is, it forms a continuous film at about room temperature.

[2] Vinsol emulsion is an oil-in-water emulsion having a solids content of 50% (wt.); in the internal (oil) phase is a hard pine resin which is insoluble in hydrocarbon solvents and has a methoxy content of 3-7% (wt.).

This emulsion vehicle composition is mixed with the inorganic powder of Example 1 so its percentage in the mixture is 30%. Enough water is added subsequently to adjust the viscosity to suit the desired method of application.

The most suitable proportions of emulsion blends have been found to fall in the range:

| | Percent |
|---|---|
| Rhoplex AC-33 | 65-40 |
| Vinsol emulsion | 35-60 |

It will be understood that amounts of the blends greater or less than 30%, based on the inorganic materials, can be used satisfactorily.

EXAMPLE IX

A coating composition is prepared in the manner described in Example III from

| | G. |
|---|---|
| Aluminum oxide | 63.7 |
| Titanium dioxide | 21.3 |
| Feldspar | 15.0 |

Seventy-seven parts by weight of the resulting comminuted mass is dispersed in 23 parts by weight of the organic carriers identified in Formulations A and B of Example II. The resulting compositions are applied to sample pieces of type 304 stainless steel, dried, and then heated for one-half hour at 2350° F. in a gas-air furnace having an oxidizing flame. The coated samples are removed from the furnace and allowed to cool in air. The coatings spall off during said cooling, and it is evident that the underlying metal surfaces have received good protection against oxidation.

Similarly good protection is secured when the proportions are changed to 71 parts $Al_2O_3$, 24 parts $TiO_2$ and 5 parts feldspar, or 67.5 parts $Al_2O_3$, 22.5 parts $TiO_2$ and 10 parts feldspar. However, these coatings do not spall off in air-cooling, but do spall off when the coated samples are quenched in water. The coatings on the air-cooled samples can be removed easily by sand-blasting.

It will be understood that the aqueous liquid carriers of certain of the examples can be replaced in toto with aqueous solution or emulsions of a wide variety of solid or solidfiable resinous organic binding materials which have a total Conradson residue less than about 3.5% by weight (ASTM Standards, 1946, part III-A, p. 120) such as cellulose derivatives, glyceride drying oils, maleinized and amine-neutralized glyceride drying oils, rosin, maleinized and amine-neutralized rosin, nitro-cellulose, carboxymethyl cellulose, cellulose acetate, cellulose butyrate, phenol/formaldehyde condensation products in various stages of resinification, amine/aldehyde and/or alkylated amine/aldehyde condensation products in various stages of resinification, thermoplastic copolymer resins, thermosetting copolymer resins, thermosetting reactive blends, etc. The water-insoluble materials can, if desired, also be used as binders by dissolving them in single or mixed volatile organic solvents.

Example IIB illustrates the usefulness of organic resinous binders which have relatively high Conradson residues and illustrates the fact that in the oxidizing furnace atmospheres wherein the coatings of this invention find special merit, the high Conradson residues can be handled satisfactorily with no detrimental results to coating or to the underlying metal.

As will be obvious, the present invention stems from my discovery of the protective qualities of the $Al_2O_3/TiO_2$ solid-state reaction products which at the subject high temperatures afford good protection, even in thin layers under 10 mils thickness, to the metallic substrates to which they are applied.

While the examples illustrate removal of the temporary ceramic coatings by spalling, it is well known that ceramic coatings can be removed by dissolution methods without harming the substrate, such as by immersing the coated article in hot aqueous caustic solutions, e.g., U.S. Patent No. 2,870,048. It will also be recognized that the coatings can be removed equally well by mechanical means, as by sand-blasting.

Having described my invention, what I claim is:

1. An easily removable coating composition for metals which are to be heated to a temperature of between about 2200° and 2400° F., which comprises:
   (A) a finely divided solids component consisting essentially of:
      (1) from about 80 to about 95 weight percent of a comminuted mixture composed of from about (a) 50 to 80 weight percent of alumina, having a purity of at least about 95%, and (b) from about 50 to about 20 weight percent of titania, having a purity of at least about 95%, and
      (2) from about 20 to about 5 weight percent of a comminuted vitreous-phase-forming material; and
   (B) an innocuous liquid carrier containing a solidifiable organic resinous binder in which (1) and (2) are suspended for application purposes.

2. A composition as claimed in claim 1 wherein said liquid carrier is an aqueous emulsion of dispersed resinous binder particles.

3. A composition as claimed in claim 1 wherein said liquid carrier consists essentially of a volatile organic solvent solution of solidifiable resinous organic binder.

4. A composition as claimed in claim 1 wherein said vitreous-phase-forming material consists essentially of alkali-metal silicates having an alkali metal oxide: $SiO_2$ ratio between 1:1 and 3:10.

5. A composition as claimed in claim 1 wherein said vitreous-phase-forming material consists essentially of feldspar.

6. A composition as claimed in claim 1 wherein said vitreous-phase-forming material is a fritted composition composed of MgO, $Al_2O_3$ and $SiO_2$ in proportions falling within the area ABCDEA of FIGURE 2.

7. A composition as claimed in claim 6 wherein up to about 6% of the MgO of said fritted composition, by weight, is replaced with alkaline earth metal oxide.

8. A composition as claimed in claim 7 which includes up to about 30%, by weight, of boric acid, based on the weight of said vitreous-phase-forming material.

9. A composition as claimed in claim 8 which further includes up to 16%, by weight, of added metal oxide selected from the group consisting of nickel oxide, iron oxide, chromic oxides and mixtures thereof, based on the weight of said vitreous-phase-forming material.

10. A composition as claimed in claim 9 which further includes up to 0.4% by weight of arsenic trioxide, based on the weight of said vitreous-phase-forming material.

11. A composition as claimed in claim 8 wherein said liquid carrier consists essentially of a volatile organic solvent solution of solidifiable resinous binder.

12. A metal article coated with a thin dry coating of the composition claimed in claim 1.

13. A metal article coated with a thin dry coating of the composition claimed in claim 8.

References Cited

UNITED STATES PATENTS

| | | | |
|---|---|---|---|
| 1,918,317 | 7/1933 | Benner et al. | 106—48 |
| 1,924,311 | 8/1933 | Frey | 106—65 |
| 2,303,514 | 12/1942 | Toepfer | 106—65 |
| 2,612,457 | 9/1952 | Davis | 106—48 |
| 3,019,116 | 1/1962 | Doucette | 106—48 |
| 3,025,188 | 3/1962 | Larsh et al. | 106—48 |
| 3,036,929 | 5/1962 | Kawashima et al. | 117—129 |
| 3,178,322 | 4/1965 | Schneider | 117—6 |
| 3,184,320 | 5/1965 | Michael | 106—49 |
| 3,222,219 | 12/1965 | Saunders et al. | 106—48 |
| 3,278,324 | 10/1966 | Nelson | 106—48 |

(Other references on following page)

FOREIGN PATENTS 549,118  11/1957  Canada.
1,171,565  10/1958  France.

OTHER REFERENCES

Fabian: Strippable Coatings, Materials in Design Engineering, May 1959, pp. 110–115.

Parmelee: Ceramic Glazes, pub. by Ind. Publ., Chicago (1951), 2nd ed., pp. 13 and 14.

HELEN M. McCARTHY, Primary Examiner

U.S. Cl. X.R.

106—48, 62, 65, 84; 117—6, 129; 148—18, 20, 28